United States Patent
Ahn

(10) Patent No.: US 9,206,489 B2
(45) Date of Patent: Dec. 8, 2015

(54) STEEL WIRE WITH HIGH STRENGTH FOR COLD FORGING TO IMPROVE SERVICE LIFE OF MOLD AND METHOD OF MANUFACTURING THE SAME

(75) Inventor: Soon-Tae Ahn, Busan (KR)

(73) Assignee: Samhwa Steel Co., Ltd., Pusan (KR)

( * ) Notice: Subject to any disclaimer, the term of this patent is extended or adjusted under 35 U.S.C. 154(b) by 414 days.

(21) Appl. No.: 13/704,995

(22) PCT Filed: Nov. 2, 2011

(86) PCT No.: PCT/KR2011/008297
§ 371 (c)(1),
(2), (4) Date: Dec. 18, 2012

(87) PCT Pub. No.: WO2012/165729
PCT Pub. Date: Dec. 6, 2012

(65) Prior Publication Data
US 2013/0087256 A1  Apr. 11, 2013

(30) Foreign Application Priority Data
Jun. 2, 2011 (KR) ........................ 10-2011-0053483

(51) Int. Cl.
| | |
|---|---|
| C21D 8/06 | (2006.01) |
| C22C 38/22 | (2006.01) |
| C22C 38/04 | (2006.01) |
| C22C 38/02 | (2006.01) |

(Continued)

(52) U.S. Cl.
CPC  *C21D 8/065* (2013.01); *C21D 1/18* (2013.01); *C21D 1/25* (2013.01); *C21D 1/42* (2013.01); *C21D 1/58* (2013.01); *C21D 1/60* (2013.01); *C21D 6/00* (2013.01); *C21D 9/0093* (2013.01); *C21D 9/525* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01)

(58) Field of Classification Search
CPC ........................................................ C21D 8/065
See application file for complete search history.

(56) References Cited

U.S. PATENT DOCUMENTS

2003/0066576 A1*  4/2003  Ahn et al. .................... 148/320

FOREIGN PATENT DOCUMENTS

| JP | 2004-162111 | 6/2004 |
|---|---|---|
| JP | 2008-080379 | 4/2008 |

(Continued)

OTHER PUBLICATIONS

KR10-0568058 machine translation.*

*Primary Examiner* — Keith Walker
*Assistant Examiner* — Stephani Gulbrandsen
(74) *Attorney, Agent, or Firm* — DeLio, Peterson & Curcio, LLC.; Peter W. Peterson

(57) ABSTRACT

A method of manufacturing high strength steel wire for cold forging containing 0.15-0.40 wt % of C, less than 1.5 wt % of Si, 0.30-2.0 wt % of Mn, less than 0.03 wt % of P, and less than 0.03 wt % of S. After initial cold-drawing, the wire rod is heated in a series of high frequency induction heating devices over the Ac3 transformation point for 30-90 seconds. The wire rod is then rapidly cooled and tempered at a temperature of from 500° C. to the A1 transformation point for 30-90 seconds. The wire rod is then cooled to achieve a tensile strength of 1,100-1, 400 MPa. The wire rod is then cold-drawn at an area reduction rate in excess of 25% and up to 40% to yield a tensile strength of 1,200-1,600 MPa, with improved service life of the mold.

7 Claims, 1 Drawing Sheet

(51) Int. Cl.
  *C22C 38/14*  (2006.01)
  *C22C 38/06*  (2006.01)
  *C21D 6/00*   (2006.01)
  *C21D 9/00*   (2006.01)
  *C21D 9/52*   (2006.01)
  *C21D 1/18*   (2006.01)
  *C21D 1/25*   (2006.01)
  *C21D 1/42*   (2006.01)
  *C21D 1/58*   (2006.01)
  *C21D 1/60*   (2006.01)
  *C22C 38/12*  (2006.01)
  *C22C 38/18*  (2006.01)

(56) References Cited

FOREIGN PATENT DOCUMENTS

JP   2009-527638   7/2009
KR   10-0568058    4/2006

* cited by examiner

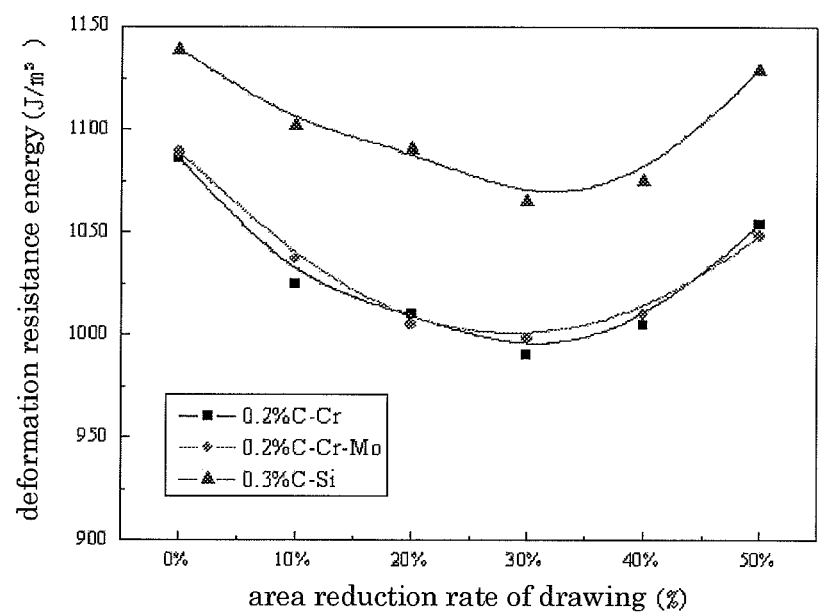

STEEL WIRE WITH HIGH STRENGTH FOR COLD FORGING TO IMPROVE SERVICE LIFE OF MOLD AND METHOD OF MANUFACTURING THE SAME

The present invention relates to a pre-heat treatment steel wire with high strength for a cold forging which is used as a material for an engine, chassis and parts (bolts and shafts) of a steering device or the like, and more particularly, to a steel wire for cold forging and a method for manufacturing the same in which by cold drawing the steel wire at a suitable area reduction rate after quenching and tempering, cold forging may be executed despite a high tensile strength of more than 1,200 MPa and a service life of a mold may be remarkably improved.

BACKGROUND ART

As a representative steel wire for cold forging in the prior art, a spheroidized annealed material and non-heat treatment steel are publicly known. The spheroidized annealed material is one which may be forged in a cold temperature by spheroidizing carbides precipitated during a heat treatment process to increase ductility. That is, the carbides which are precipitated by heating at a temperature of about 700° C. over 13 to 17 hours is spheroidized, such that its tensile strength lowers to 500-600 MPa to facilitate the forging of the same. However, it has drawbacks in that after a forging process, an additional heat treatment must follow to increase the tensile strength, leading to difficulty in the process and an increase of production cost.

Hence, recently non-heat treatment steel has been briskly developed by omitting the heat treatment of quenching and tempering after a forging process so as to attain cost reduction. Most non-heat treatment steels are composite structures of a ferrite and a pearlite and added by numerous alloy elements, so that they have no problems to forge a part with relatively simple and low machinability having a tensile strength less than 800 MPa. However, in reality, cold forging of a part with complicated shapes having a tensile strength more than 900 MPa, such as a hexagonal flange bolt or the like, is impossible because a cementite present in the pearlite as a lamellar shape is early fractured. Meanwhile, in consideration of the problems mentioned in the conventional steel wire for cold forging, the applicants of the present invention have developed a steel wire, as a high strength steel wire for cold forging with a new concept which does not create cracks during cold forging of a part such as a bolt or the like despite a very high tensile strength of 700-1,300 MPa, which is registered as Korean Patent No. 046971. Recently, in accordance with continuing pursuit of global environmental preservation and development of a light-weight vehicle by automakers there has been raised a strong need to develop a super high strength steel wire having a range of 1,200-1,600 MPa and capable of being cold forged. However, the tensile strength with such a range as in the above is too high, which easily generates cracks during a forging process and considerably lowers the service life of a mold for cold forging. Therefore, in fact, it is impossible to further increase the strength of the steel wire with present technology levels.

DETAILED DESCRIPTION OF THE INVENTION

Technical Problem

Therefore, the present invention has been made in view of the above-mentioned problems in the conventional steel wire for cold forging and recent need for developing higher strength, and an object of the present invention is to provide a high strength steel wire for cold forging and a manufacturing method thereof, in which even though the tensile strength of the material is super high having a range of 1,200-1,600 MPa, it creates no cracks during cold forging of constructional and vehicle parts and remarkably improves the service life of a mold.

Technical Solution

The above object can be achieved based on a new fact not publicly known hitherto that if executing a cold drawing at a specific range of area reduction rates for a high strength steel wire which has been quenched and tempered, it may represent good cold forging characteristics without causing creation of cracks due to decrease of deformation resistance energy.

The inventors of the present invention come to find out the above facts during a variety of trials and repetitious experiments in order to develop a new steel wire whose tensile strength is basically over 1,200 MPa and which may allow cold forging and improve the service life of a mold.

Up to now, it is generally regarded as impossible in the related industries and for researchers to execute cold forging of a steel wire with a tensile strength over 1,300 MPa which has been only quenched and tempered. However, in a case of cold forging of a steel wire obtained by a specific amount of drawing after quenching and tempering it would be noted that, despite an increase of the tensile strength compared with the wire before being forged, the steel wire is processed in an opposite direction to a deformation direction of the metal structure due to drawing, such that the deformation resistance energy is considerably reduced to improve the cold forgeability as well as the service life of the mold.

Now a more detailed description thereof will follow. Carbon steel capable of being quenched and used for a machine structure is rapidly heated to over an Ac3 transformation point and maintained in its heated state. The carbon steel is then rapidly cooled by water or oil and executed by tempering at 500° C. to the A1 transformation point, resulting in a wire having a tensile strength of 1,100-1,400 MPa. When the wire is thereafter drawn at an area reduction rate of 25-40%, it would be noted that in spite of very high tensile strength of 1,200-1,600 MPa the manufactured wire can be cold forged without creating cracks and the service life of the mold may be remarkably improved.

The chemical composition of the wire used in the method of the present invention has a basic composition system, including: 0.15-0.40 wt % of C, less than 1.5 wt % of Si, 0.30-2.0 wt % of Mn, less than 0.03 wt % of P, less than 0.03 wt % of S, and the remainder including Fe and inevitable impurities. Depending upon cases, at least one or more of the components of 0.05-2.0 wt % of Cr, 0.05-1.5 wt % of Mo, 0.01-0.10 wt % of Ti, 0.0003-0.0050 wt % of B and 0.01-0.05 wt % of Al may be added to the composition described above. Reasons to limit the content range of each element are as follows.

C: 0.15-0.40 wt %

C is the most important element to be added so as to increase strength at the time of quenching. Generally known in the art, it is hard to expect hardening effects through a heat treatment of quenching less than 0.15 wt % of C. In contrast, if the added amount exceeds 0.40 wt %, toughness is lowered and deformation resistance is increased due to precipitation of large amount of carbides, leading to a creation of cracks and deterioration of the service life of a tool during a cold roll-forging.

Si: Less than 1.5 wt %

Si is an element to be added for deoxidization of steel to increase the strength by solid solution strengthening. If the added amount of Si is in excess of 1.5 wt %, the toughness is lowered to increase the deformation resistance at the time of cold roll-forging, which causes an occurrence of cracking and degradation of the service life of the tool. This is because Si exists in a solid solution within the precipitated carbides and hinders the movement of a carbon, thereby inhibiting the spheroidization of the carbides.

Mn: 0.30-2.0 wt %

Mn is effective as an element for solid solution strengthening. It is added to avoid an increase of the deformation resistance which may occur in excess amount of C and Si being added. Further, Mn is an element to supplement the strength decrease in steel with low addition of C and Si. Thus, to expect the effect mentioned above, at least 0.30 wt % of Mn needs to be added. If it is added in excess of that amount, it increases the toughness and deformation resistance. Therefore, the added amount of Mn must not exceed 2.0 wt %.

Cr: 0.05-2.0 wt %

Cr is an element to promote quenching hardness and toughness. When the added amount of Cr is less than 0.05 wt %, improvement of such effects on the characteristics mentioned above is not noticeable. Cr is an expensive element, so if its content exceeds 2.0 wt %, the cost-effectiveness is degraded. Hence, the lower limit for the added amount of Cr is 0.05 wt % and the upper limit for the added amount of Cr is 2.0 wt %.

Mo: 0.05-1.5 wt %

Mo has nearly the same effects of addition as Cr.

When the added amount of Mo is less than 0.05 wt %, it provides no substantial effect. When the added amount of Mo exceeds 1.5 wt %, the deformation resistance for cold working increases and therefore its added amount must be limited to not more than 1.5 wt %.

B: 0.0003-0.0050 wt %

B is an element effective for improving quench-hardenability. When it is added in an amount less than 0.0003 wt %, the effect of addition is not clear. When the added amount is in excess of 0.0050 wt %, it even degrades quench-hardenability.

Ti: 0.01-0.10 wt %

Ti co-exists with B and is effective for promoting quench strength, but it has great effects of grain refinement of austenite. However, when the added amount of Ti is less than 0.01 wt %, its effect is not sufficient. When it is in excess of 0.1 wt %, the interstitial substances increase to lower the respective physical properties to be required.

Al: 0.01-0.05 wt %

Al combines with nitrogen (N) and has an effect of restraining grain growth of austenite. When large amount of Al is added, lots of interstitial substances of aluminum oxides are generated, which lowers ductility. Therefore, for the purpose of achieving the object of the present invention, the preferable range of Al content is in the range of 0.01-0.05 wt %.

P and S are elements of inevitable impurities in steel, which are precipitated at the grain boundaries when executing a tempering process, deteriorating impact toughness, and lowering strain at the time of cold working. Hence, their contents need to be limited not to exceed 0.030 wt %, respectively as soon as possible.

A method of manufacturing a high strength steel wire for cold forging in accordance with the present invention with respect to steel materials having chemical compositions as illustrated above will be described as follows.

The method of manufacturing a high strength steel wire for cold forging in accordance with the present invention, including the steps of: cold drawing of a wire rod containing 0.15-0.40 wt % of C, less than 1.5 wt % of Si, 0.30-2.0 wt % of Mn, less than 0.03 wt % of P, less than 0.03 wt % of S and the remainder including e and unavoidable impurities; rapidly heating the cold drawn wire rod in a series of high frequency induction heating devices over Ac3 transformation point for 30-90 seconds and maintaining such a heated state; rapidly cooling the wire rod in the heated state by water or oil; executing a tempering process by heating the wire rod to 500° C. to the A1 transformation point for 30-90 seconds including a holding time at such a temperature; cooling the heated wire rod by water to achieve the wire rod with a tensile strength of 1,100-1,400 MPa; and cold drawing the wire rod at an area reduction rate of 25-40% to yield a tensile strength of 1,200 1,600 MPa.

When carrying out a heat treatment for steel materials having chemical compositions as described above in the present invention, the reason to select quenching/tempering is that the carbides precipitated at the time of tempering after quenching have fine grains, such that if tempering is executed at a high temperature of 500° C. to the A1 transformation point, the precipitated carbides are spheroidized to remarkably reduce the crack creation rate in cold forging.

Further, the reason to limit the tensile strength obtained after quenching and tempering to a range of 1,100-1,400 MPa is to guarantee the tensile strength of 1,200-1,600 MPa for the targeted final product when drawing the steel wire being quenched and tempered at an area reduction rate of 25-40%.

The characteristic technical configurations of the present invention reside at drawing a steel wire which has been quenched and tempered at the area reduction rate of 25-40%. This result was obtained by the inventors through numerous tests on the composition of steel materials of the present invention by means of changing the conditions of cold drawing, which may be confirmed in a graph of FIG. 1 illustrating measurement of a deformation resistance energy ($J/m^3$) according to an area reduction rate (%) of drawing.

That is, as shown in FIG. 1, when cold roll-forging the steel wire being quenched and tempered and having a tensile strength grade of 1,150 MPa, it will be noted that the steel wire drawn at the area reduction rate of 25-40% has the lowest deformation resistance energy. Here, the chemical composition of the steel wire used has three types of steel, containing by weight %, 0.2% C-1.0% Cr, 0.2% C-1.1% Cr-0.2% Mo and 0.3% C-1.0% Si.

Advantageous Effects

In the prior art, a hot wire manufactured only by executing quenching and tempering having a tensile strength more than 1,300 MPa cannot be used for cold forging and cannot be commercialized due to a considerably low service life of the mold. The steel wire obtained through a method of the present invention makes it possible to stably execute a cold forging process up to a tensile strength of 1,600 MPa, so that it may extend the service life of the mold and allow materials for vehicle parts to be innovatively light weighted to reduce exhaust of green house gases, and thereby enhancing industrial applicability thereof.

BRIEF DESCRIPTION OF THE DRAWINGS

Accompanying FIG. 1 is a graph illustrating measurement of a deformation resistance energy ($J/m^3$) according to an area reduction rate of drawing.

MODE FOR CARRYING OUT THE INVENTION

Detailed embodiments of the present invention will be described hereinafter.

The chemical compositions of the steel materials used in the embodiment of the present invention are illustrated in Table 1 below. A hot-rolled wire rod with a diameter of 18 mm is cold drawn into a wire rod having a diameter of 16 mm. The cold drawn wire is then rapidly heated to over Ac3 transformation point for 30 90 seconds, maintained in its heated state, and rapidly cooled by water or oil. Next, the wire is tempered at 500° C. to the A1 transformation point for 30-90 seconds, so that a wire having a tensile strength with a range of 1,100-1,400 MPa is obtained. The wire is cold drawn again at an area reduction rate of 25-40% to finally form an exemplary steel wire with a tensile strength of 1 1 200-1,600 MPa.

Meanwhile, a specimen applied for a tensile strength test on the steel wire manufactured through the processes as described above is a standard specimen of ASTM E8 of 6.25 mm diameter. Compression test is conducted by making a specimen having 10 mm in diameter and 15 mm in height by way of an exclusive compression test machine of 100-ton capacity. At this point, the deformation resistance energy is calculated by obtaining a graph area up to a strain of 0.9 on a true stress—true strain curve being drawn.

Moreover, in order to evaluate the service life of the mold when cold forging the finally manufactured steel wire, a flange bolt M10 is forged and the life span of the mold is measured until the mold is broken, and then the result of measurement is compared. Here, a targeted service life of the mold, in consideration of economy, is at least over 50,000 blows. In general, the number of blows for the steel wire having a grade of the tensile strength over 1,200 MPa is far less than 50,000.

TABLE 1

| Specimen | Chemical Composition (wt %) | | | | | | | | | | |
|---|---|---|---|---|---|---|---|---|---|---|---|
| | C | Si | Mn | P | S | Cr | Mo | B | Al | Ti | Fe |
| 1 | 0.2 | 0.25 | 0.83 | 0.015 | 0.011 | — | — | — | 0.02 | — | balance |
| 2 | 0.22 | 0.28 | 1.37 | 0.012 | 0.009 | 1.16 | — | — | — | — | balance |
| 3 | 0.21 | 0.23 | 0.95 | 0.012 | 0.007 | 1.13 | 0.35 | — | — | — | balance |
| 4 | 0.22 | 0.25 | 0.75 | 0.013 | 0.011 | — | — | 0.002 | — | 0.003 | balance |
| 5 | 0.32 | 0.78 | 0.75 | 0.011 | 0.01 | 0.25 | 0.18 | — | — | — | balance |

Table 2 shows results of evaluation of a tensile test and a compression test for embodiments and exemplary specimens which are obtained through heat treatment processes and cold drawing processes as described above with respect to specimens having chemical compositions as shown in Table 1 as well as the service life of a mold for a finally manufactured steel wire.

TABLE 2

| | | Tensile Strength after QT (Mpa) | Area Reduction rate at Quenching/ Tempering after QT (Mpa) | Tensile Strength after Drawing (Mpa) | Deformation Resistance Energy (J/m3) | Service Life of Mold when Bolt Forging (more than 50,000 blows) |
|---|---|---|---|---|---|---|
| Specimen 1 | Comparative Example 1 | 1,115 | 5 | 1,135 | 1,045 | X |
| | Example 1 | | 25 | 1,214 | 966 | ○ |
| | Example 2 | | 35 | 1,225 | 975 | ○ |
| | Comparative Example 2 | | 50 | 1,308 | 1,032 | X |
| Specimen 2 | Comparative Example 3 | 1,155 | 5 | 1,187 | 1,065 | X |
| | Example 3 | | 25 | 1,270 | 938 | ○ |
| | Example 4 | | 35 | 1,300 | 997 | ○ |
| | Comparative Example 4 | | 50 | 1,385 | 1,050 | X |
| Specimen 3 | Comparative Example 5 | 1,252 | 5 | 1,312 | 1,175 | X |
| | Example 5 | | 25 | 1,411 | 1,113 | ○ |
| | Example 6 | | 35 | 1,442 | 1,084 | ○ |
| | Comparative Example 6 | | 50 | 1,527 | 1,132 | X |
| Specimen 4 | Comparative Example 7 | 1,269 | 5 | 1,300 | 1,159 | X |
| | Example 7 | | 25 | 1,407 | 1,078 | ○ |
| | Example 8 | | 35 | 1,432 | 1,083 | ○ |
| | Comparative Example 8 | | 50 | 1,517 | 1,126 | X |
| Specimen 5 | Comparative Example 9 | 1,350 | 5 | 1,371 | 1,315 | X |
| | Example 9 | | 25 | 1,468 | 1,275 | ○ |
| | Example 10 | | 35 | 1,548 | 1,285 | ○ |
| | Comparative Example 10 | | 50 | 1,660 | 1,378 | X |

In Table 2, symbol "○" denotes a case when no cracks occur and symbol "X" denotes a case when cracks occur.

As can be seen in Table 2, it will be appreciated that, at the time of manufacturing a steel wire in accordance with the present invention, if a drawing process is executed after quenching and tempering, the more the area reduction rate increases, the more the tensile strength enhances. Nonetheless, in particular, at the range of 25-40% of the area reduction rate it will be noted that the deformation resistance energy is remarkably reduced when compressing the specimen. In this case, it was also found that all the specimens manufactured according to the embodiment of the present invention showed a service life of the mold to be more than 50,000 blows.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of manufacturing a high strength steel wire for cold forging, comprising the steps of:
   cold-drawing a wire rod containing 0.15-0.40 wt % of C, less than 1.5 wt % of Si, 0.30-2.0 wt % of Mn, less than 0.03 wt % of P, less than 0.03 wt % of S, and the remainder including Fe and unavoidable impurities;
   heating the cold drawn wire rod in a series of high frequency induction heating devices over Ac3 transformation point for 30-90 seconds and maintaining such a heated state;
   cooling the wire rod in the heated state by water or oil;
   executing a tempering process by heating the wire rod to 500° C. to the A1 transformation point for 30-90 seconds including a holding time at such a temperature;
   cooling the heated wire rod by water to achieve a wire rod with a tensile strength of 1,100-1,400 MPa; and
   cold-drawing the wire rod at an area reduction rate in excess of 25% and up to 40% to yield a tensile strength of 1,200-1,600 MPa.

2. The method as recited in claim 1, wherein the steel wire comprises at least one or more components among 0.05-2.0 wt % of Cr, 0.05-1.5 wt % of Mo, 0.01-0.10 wt % of Ti, 0.0003-0.0050 wt % of B and 0.01-0.05 wt % of Al.

3. The method as recited in claim 1, wherein the steel wire includes 0.05-2.0 wt % of Cr.

4. The method as recited in claim 1, wherein the steel wire includes 0.05-1.5 wt % of Mo.

5. The method as recited in claim 1, wherein the steel wire includes 0.01-0.10 wt % of Ti.

6. The method as recited in claim 1, wherein the steel wire includes 0.0003-0.0050 wt % of B.

7. The method as recited in claim 1, wherein the steel wire includes 0.01-0.05 wt % of Al.

* * * * *